(12) United States Patent
Jiang (10) Patent No.: US 12,304,543 B2
(45) Date of Patent: May 20, 2025

(54) FOLDING CART

(71) Applicant: Zhongshan Kanglaiya Trade Co., Ltd., Zhongshan (CN)

(72) Inventor: Zelian Jiang, Zhongshan (CN)

(73) Assignee: ZHONGSHAN KANGLAIYA TRADE CO., LTD., Zhongshan (CN)

( * ) Notice: Subject to any disclaimer, the term of this patent is extended or adjusted under 35 U.S.C. 154(b) by 0 days.

(21) Appl. No.: 19/008,560

(22) Filed: Jan. 2, 2025

(65) Prior Publication Data

US 2025/0136160 A1 May 1, 2025

(30) Foreign Application Priority Data

Nov. 29, 2024 (CN) .......................... 202422929298.6

(51) Int. Cl.
| | |
|---|---|
| *B62B 3/00* | (2006.01) |
| *B62B 3/02* | (2006.01) |
| *B62B 5/00* | (2006.01) |
| *B62B 5/06* | (2006.01) |

(52) U.S. Cl.
CPC .............. *B62B 3/007* (2013.01); *B62B 3/025* (2013.01); *B62B 5/0013* (2013.01); *B62B 5/064* (2013.01); *B62B 2205/06* (2013.01)

(58) Field of Classification Search
None
See application file for complete search history.

(56) References Cited

U.S. PATENT DOCUMENTS

| | | | | |
|---|---|---|---|---|
| 605,224 | A * | 6/1898 | Green ...................... | B62B 3/02 280/640 |
| 8,388,015 | B2 * | 3/2013 | Chen ........................ | B62B 3/02 280/642 |
| 8,973,940 | B2 * | 3/2015 | Chen ........................ | B62B 3/02 280/638 |

(Continued)

FOREIGN PATENT DOCUMENTS

| | | | | |
|---|---|---|---|---|
| CN | 217456036 | U | * 9/2022 | |
| CN | 117901923 | A | * 4/2024 | ............... B62B 3/02 |

(Continued)

OTHER PUBLICATIONS

Translated CN-117901923-A (Year: 2025).*

*Primary Examiner* — James A Shriver, II
*Assistant Examiner* — Ian Bryce Shelton
(74) *Attorney, Agent, or Firm* — Daniel M. Cohn (57) ABSTRACT

The present invention discloses a folding cart, which comprises a front frame including a front bottom rod that can be turned upwards and downwards, a rear frame including a rear bottom rod that can be rotatably unfolded or folded relative to the front bottom rod and a foldable reinforcement assembly for connecting the front and rear bottom rods. In an unfolded state, the front and rear frames are away from each other for unfolding. In a folded state, the front frame and the rear frame are close to each other for folding. Through the foldable reinforcement assembly, the bearing capacity of the frame with a single bottom rod is strengthened after the frames are unfolded, avoiding deformations of the frames due to low strength, and the foldable reinforcement assembly can also be folded together with the frame when the frame is folded, which is convenient for storage.

10 Claims, 5 Drawing Sheets

(56) References Cited

U.S. PATENT DOCUMENTS

| | | | | |
|---|---|---|---|---|
| 10,272,937 B2* | 4/2019 | Chen | ..................... | B62B 5/0003 |
| 10,464,588 B1* | 11/2019 | Lin | ........................... | B62B 7/08 |
| 10,633,010 B1* | 4/2020 | Zhang | ..................... | B62B 3/025 |
| 10,988,153 B1* | 4/2021 | Horowitz | ................ | B62B 7/008 |
| 11,745,777 B2* | 9/2023 | Yang | ........................ | B62B 3/02 |
| | | | | 280/39 |
| 11,958,520 B1* | 4/2024 | Sun | ........................ | B62B 5/067 |
| 12,157,512 B1 | 12/2024 | Jiang | | |
| 2010/0156069 A1* | 6/2010 | Chen | ..................... | B62B 9/142 |
| | | | | 280/639 |
| 2015/0035258 A1* | 2/2015 | Chen | ..................... | B62B 3/007 |
| | | | | 280/651 |
| 2017/0259838 A1* | 9/2017 | Choi | ..................... | B62B 3/007 |
| 2018/0297622 A1* | 10/2018 | Chen | ..................... | B62B 5/0003 |
| 2020/0283046 A1* | 9/2020 | Wu | ........................ | B62B 3/007 |
| 2023/0037666 A1* | 2/2023 | Yang | .................... | B62B 5/0013 |
| 2023/0219608 A1* | 7/2023 | Jiang | ..................... | B62B 3/025 |
| | | | | 280/651 |
| 2023/0249730 A1* | 8/2023 | Tong | ..................... | B62B 3/022 |
| | | | | 280/651 |
| 2023/0365179 A1* | 11/2023 | Liu | ..................... | B62B 5/0013 |
| 2024/0124040 A1* | 4/2024 | Conn | ..................... | B62B 5/067 |
| 2024/0132129 A1* | 4/2024 | Sun | ..................... | B62B 3/007 |
| 2024/0166252 A1* | 5/2024 | Wu | ........................ | B62B 3/002 |
| 2024/0190492 A1* | 6/2024 | Frankel | .................. | B62B 3/007 |
| 2024/0227893 A9* | 7/2024 | Sun | ........................ | B62B 5/064 |
| 2025/0002064 A1* | 1/2025 | Jiang | ..................... | B62B 3/02 |

FOREIGN PATENT DOCUMENTS

| | | | | |
|---|---|---|---|---|
| DE | 202023100551 U1 * | 6/2023 | ............. | B62B 3/007 |
| KR | 101623353 B1 * | 5/2016 | | |
| KR | 20230001990 U * | 10/2023 | | |
| WO | WO-2021027808 A1 * | 2/2021 | | |
| WO | WO-2024103287 A1 * | 5/2024 | | |

* cited by examiner

FOLDING CART

RELATED APPLICATIONS

The present patent document claims the benefit of priority to Patent Application No. 202422929298.6, filed Nov. 29, 2024, and entitled "FOLDING CART," the entire contents of each of which are incorporated herein by reference.

BACKGROUND

1. Technical Field

The present invention relates to the technical field of folding carts, and particularly relates to a folding cart.

2. Background Information

A cart is a tool used for carrying objects, which is generally composed of one or more wheels, a frame and a handle, however, an overall area of the cart is quite large and inconvenient to transport, thus people have launched a folding cart that can be folded so as to reduce the overall area of the cart. Since the structure of the cart becomes foldable, which will lead to the structural strength of the cart after being unfolded is not as strong as the cart that cannot be folded, resulting in a larger limitation of the folding cart.

BRIEF SUMMARY

In order to overcome the above disadvantages, the present invention aims to provide a technical solution that can improve the structural strength of the folding cart after being unfolded.

In order to achieve the above purpose, the present invention provides the following technical solutions.

A folding cart, having a folded state and an unfolded state, comprises a front frame, a rear frame and a foldable reinforcement assembly; wherein the front frame and the rear frame are far away from each other for unfolding in the unfolded state, and the front frame and the rear frame are closed to each other for folding in the folded state. The front frame includes a front bottom rod that can be turned upwards and downwards, and the rear frame includes a rear bottom rod that can be rotatably unfolded or folded relative to the front bottom rod, and the foldable reinforcement assembly is used for connecting the front bottom rod and the rear bottom rod.

As a further solution of the present invention, the foldable reinforcement assembly includes a first reinforcing rod hinged to the front frame and a second reinforcing rod hinged to the rear frame, an end of the first reinforcing rod is hinged with an end of the second reinforcing rod; the first reinforcing rod is hinged with a first connecting rod hinged with the front bottom rod, and the second reinforcing rod is hinged with a second connecting rod hinged with the rear bottom rod.

As a further solution of the present invention, the front frame is provided with a first supporting frame, the first supporting frame includes a first direct-connecting part connected with the front frame and a first hinging part hinged with the first reinforcing rod, and the first direct-connecting part is relatively bent with the first hinging part; the rear frame is provided with a second supporting frame, the second supporting frame includes a second direct-connecting part connected with the rear frame and the second hinging part hinged with the second reinforcing rod, and the second direct-connecting part is relatively bent with the second hinging part.

As a further solution of the present invention, an end of the rear bottom rod is connected with a locking member, and an end of the front bottom rod is located inside the locking member and forms a hinge.

As a further solution of the present invention, an end of the locking member is provided with a lapping portion used for lapping on the front bottom rod in the unfolded state.

As a further solution of the present invention, the front frame further includes a first mainframe and a first top rod hinged to an upper portion of the first mainframe; the front bottom rod is hinged to a lower portion of the first mainframe; the rear frame further includes a second mainframe and a second top rod hinged to an upper portion of the second mainframe; the rear bottom rod is hinged to a lower portion of the second mainframe; a connector is provided between the first top rod and the second top rod, and an end of the first top rod and an end of the second top rod are both hinged with the connector.

As a further solution of the present invention, a linkage supporting frame is provided on the front frame and the rear frame used for ensuring the stability when the front frame and the rear frame are unfolded.

As a further solution of the present invention, the linkage supporting frame includes a first linking rod hinged to the front bottom rod, an end of the first linking rod is hinged with a first swing rod, and an end of the first swing rod is hinged with the second top rod; a second linking rod is hinged to the rear bottom rod, an end of the second linking rod is hinged with a second swing rod, an end of the second swing rod is hinged with the first top rod, and an intersection of the first linking rod and the second linking rod is hinged together by rivets.

As a further solution of the present invention, both the first mainframe and the second mainframe are provided with detachable supporting rods, and a ceiling is provided on the supporting rods.

As a further solution of the present invention, both the first mainframe and the second mainframe are provided with detachable rolling wheels, and the second mainframe is hinged with a pushing rod.

Compared with the prior art, the beneficial effect of this technical solution of the present invention is as follows: through the foldable reinforcement assembly, the bearing capacity of the single bottom rod frame is strengthened after the frame is unfolded, avoiding deformations of the frame due to low strength of the frame, and the foldable reinforcement assembly can also be folded together with the frame when the frame is folded, which is convenient for storage.

The additional aspects and advantages of the present invention will be given in the following descriptions, and some of them will become obvious from the following descriptions or be understood through the practice of the present invention.

BRIEF DESCRIPTION OF THE DRAWINGS

In order to illustrate the technical solutions in the embodiments of the present disclosure or the technical solutions in the prior art more clearly, the drawings required in the description of the embodiments or prior art will be briefly introduced below. It is obvious that the drawings described in the following are only some embodiments of the present

The corresponding reference numbers in the drawings are as follows.

front frame 1; front bottom rod 11; first supporting frame 12; first direct-connecting part 121; first hinging part 122; first mainframe 13; first top rod 131; supporting rod 14; ceiling 15; rolling wheel 16; rear frame 2; rear bottom rod 21; locking member 211; lapping portion 212; second supporting frame 22; second direct-connecting part 221; second hinging part 222; second mainframe 23; second top rod 231; pushing rod 24; connector 3; foldable reinforcement assembly 4; first reinforcing rod 41; first connecting rod 411; second reinforcing rod 41; second connecting rod 421; linkage supporting frame 5; first linking rod 51; first swing rod 52; second linking rod 53; second swing rod 54.

DETAILED DESCRIPTION OF THE DRAWINGS AND THE PRESENTLY PREFERRED EMBODIMENTS

The technical solutions in the embodiments of the present disclosure will be illustrated in detail in combination with the embodiments and the drawings. Obviously, the described embodiments are merely some of the embodiments of the present invention, instead of all embodiments of the present invention. According to the embodiments in the present invention, all other embodiments obtained by a person skilled in the art without making creative efforts shall fall within the scope of the present invention.

Please refer to FIGS. 1-5, a folding cart has a folded state and an unfolded state, wherein the folding cart comprises a front frame 1, a rear frame 2 and a foldable reinforcement assembly 4; the front frame 1 and the rear frame 2 are far away from each other for unfolding in the unfolded state, and the front frame 1 and the rear frame 2 are closed to each other for folding in the folded state. The front frame 1 includes a front bottom rod 11, and the rear frame 2 includes a rear bottom rod 21 that can be rotatably unfolded or folded relative to the front bottom rod 11. The foldable reinforcement assembly 4 is used for connecting the front bottom rod 11 and the rear bottom rod 21. The front bottom rod and the rear bottom rod can be supported and reinforced after the frame is unfolded through the foldable reinforcement assembly, avoiding deformations of the frame due to low strength of the frame, and the foldable reinforcement assembly can also be folded together with the frame when the frame is folded.

Figure 1:
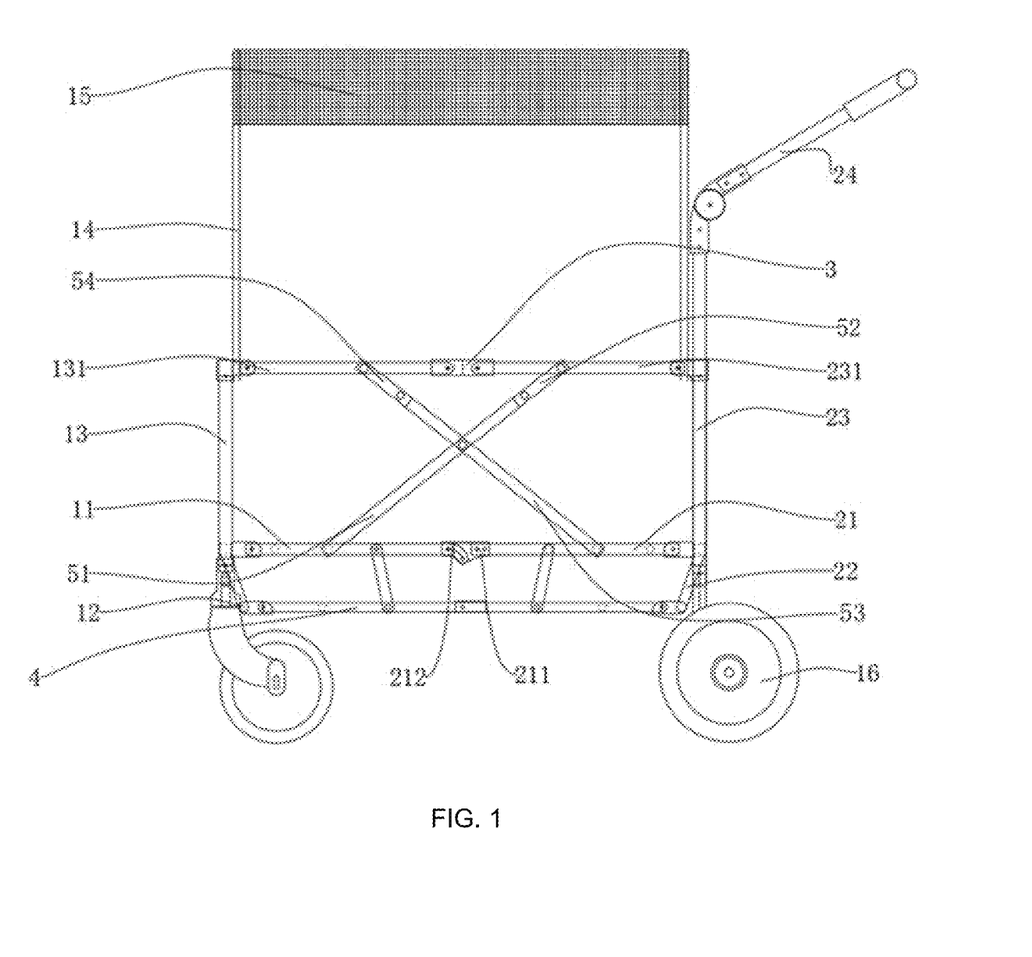
FIG. 1 is a schematic view of an overall frame in an unfolded state according to the present invention.
Figure 2:
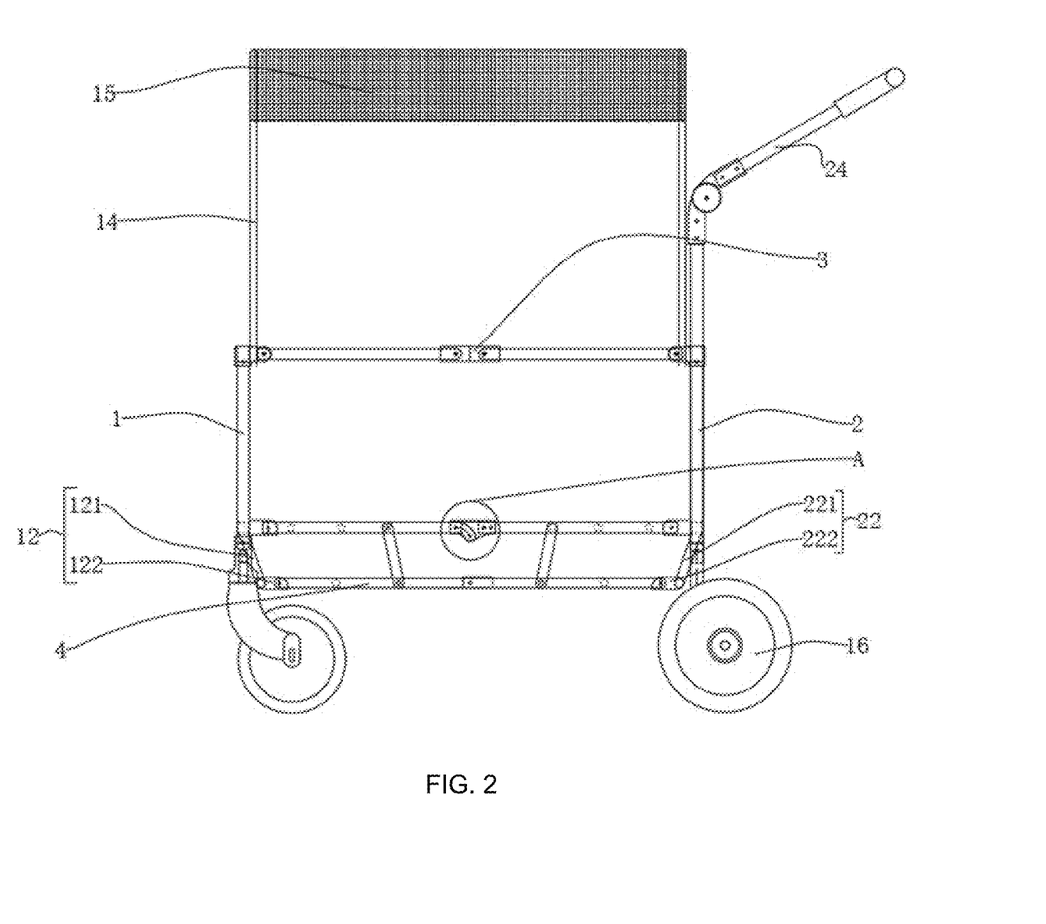
FIG. 2 is a schematic view of a foldable reinforcement assembly in an unfolded state according to the present invention.
Figure 5:
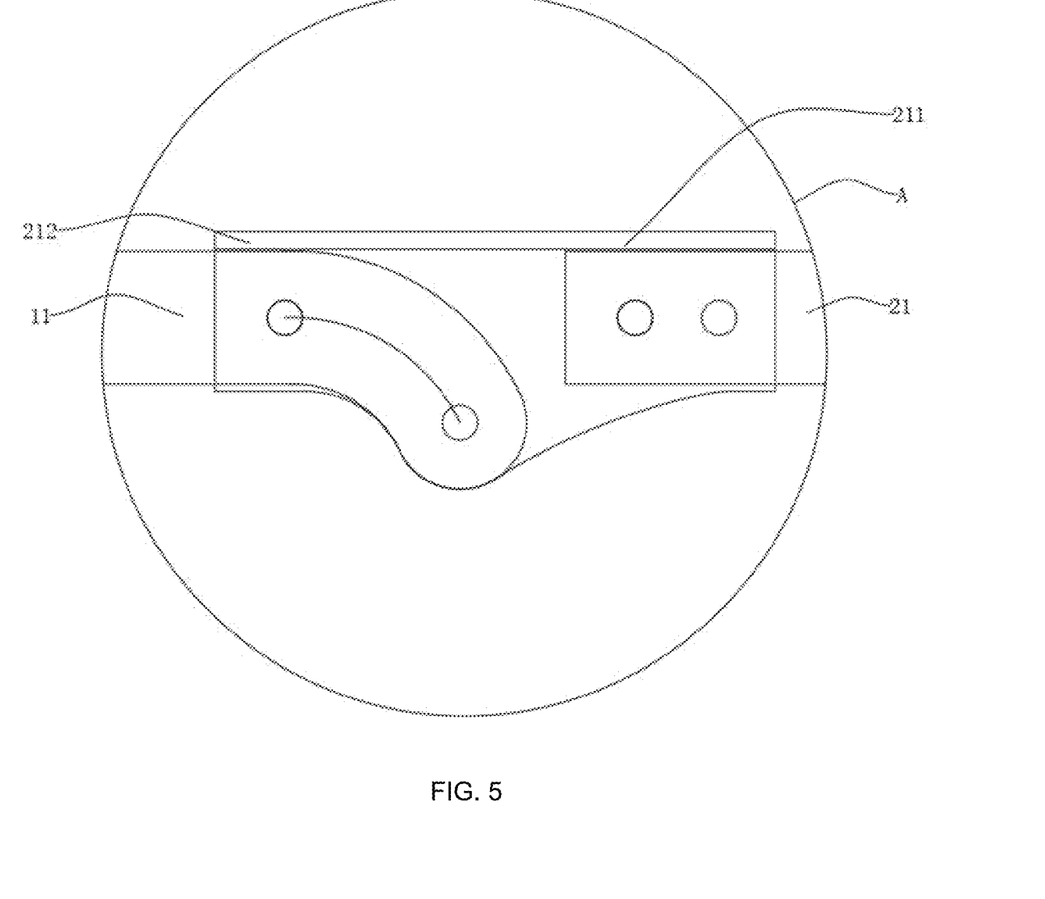
FIG. 5 is a schematic view of a partial magnification of Part A in FIG. 2.

In some embodiments, the foldable reinforcement assembly 4 includes a first reinforcing rod 41 hinged to the front frame 1 and a second reinforcing rod 42 hinged to the rear frame 2. An end of the first reinforcing rod 41 and an end of the second reinforcing rod 42 form a hinge. The first reinforcing rod 41 is hinged with a first connecting rod 411 hinged with the front bottom rod 11, and the second reinforcing rod 42 is hinged with a second connecting rod 421 hinged with the rear bottom rod 21. The front frame 1 is provided with a first supporting frame 12, the first supporting frame 12 includes a first direct-connecting part 121 connected with the front frame 1 and a first hinging part 122 hinged with the first reinforcing rod 41, and the first direct-connecting part 121 is relatively bent with the first hinging part 122. The second supporting frame 22 includes a second direct-connecting part 221 connected with the rear frame 2 and a second hinging part 222 hinged with the second reinforcing rod 42, and the second direct-connecting part 221 is relatively bent with the second hinging part 222. Further, the first direct-connecting part 121 is longer than the first hinging part 122, the second direct-connecting part 221 is longer than the second hinging part 222. An end of the rear bottom rod 21 is connected with a locking member 211, and an end of the front bottom rod 11 is located inside the locking member 211 and forms a hinge. An end of the locking member 211 protrudes from an end of the rear bottom rod 21, and the locking member 211 is in groove shape. An end of the locking member 211 away from the rear bottom rod 21 is provided with a lapping portion 212 used for lapping on the front bottom rod 11 in the unfolded state. The front frame 1 includes a first mainframe 13 and a first top rod 131 hinged to the first mainframe 13, and the rear frame 2 includes a second mainframe 23 and a second top rod 231 hinged to the second mainframe 23. A connector 3 is arranged between the first top rod 131 and the second top rod 231, an end of the first top rod 131 and an end of the second top rod 231 are both hinged with the connector 3. When the front frame 1 and the rear frame 2 are in the unfolded state, the first reinforcing rod 41 and the second reinforcing rod 42 are also in the unfolded state, so that the first connecting rod 411 and the second connecting rod 421 can share the weight borne by the front bottom rod 11 and the rear bottom rod 21 to the first reinforcing rod 41 and the second reinforcing rod 42 respectively, thus to play the role of reinforcement.

Specifically, the other end of the first reinforcing rod 41 and the other end of the second reinforcing rod 42 are connected to the front frame 1 and the rear frame 2, respectively. An end of the first connecting rod 411 is hinged on a middle of the first reinforcing rod 41, the other end of the first connecting rod is further hinged on a middle of the front bottom rod 11, and an end of the second connecting rod 421 is hinged on a middle of the second reinforcing rod 42, the other end of the second connecting rod is further hinged on a middle of the rear bottom rod 21.

Figure 3:
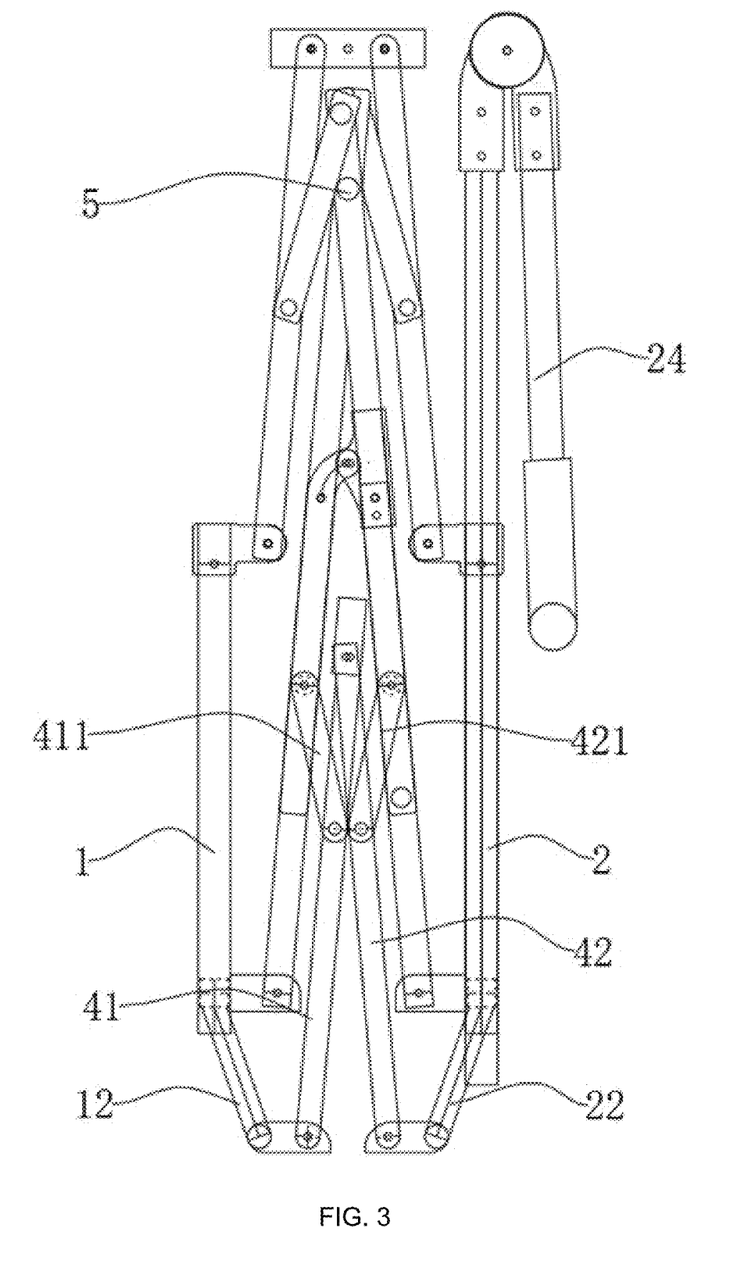
FIG. 3 is a schematic view of the overall frame in a folded state according to the present invention.
Figure 4:
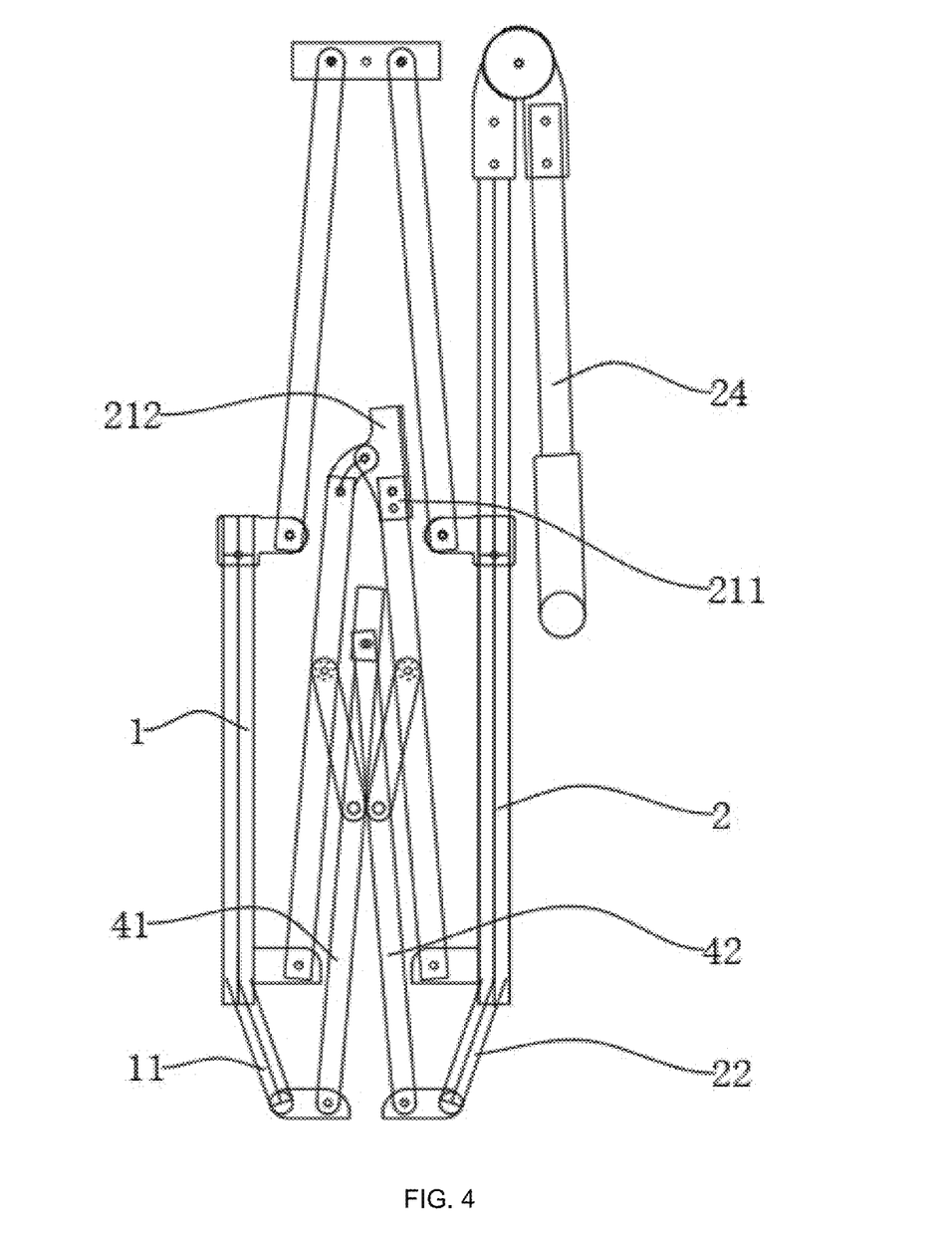
FIG. 4 is a schematic view of the foldable reinforcement assembly in a folded state according to the present invention.

Specifically, when the front frame 1 and the rear frame 2 need to be folded, the front frame 1 and the rear frame 2 are pushed in an opposite direction; when the front frame 1 and the rear frame 2 are moving, they will drive the first top rod 131 and the second top rod 231 to move close to one another respectively, so that the front bottom rod 11 and the rear bottom rod 21 also begin to approach each other, and the volume between the front frame 1 and the rear frame 2 begins to reduce, so that the purpose of folding the front frame 1 and the rear frame 2 can be achieved.

When the front frame 1 and the rear frame 2 need to be unfolded, the front frame 1 and the rear frame 2 are pulled along a direction away from each other, and the first top rod 131 and the second top rod 231 will start to move away from each other, so that the first mainframe 13 and the second mainframe 23 start to move away from each other; meanwhile the front bottom rod 11 and the rear bottom rod 21 will also start to move away from each other, and an end of the front bottom rod 11 is rotated again to enter into the inside of the locking member 211, so that the lapping portion 212 is lapped on the front bottom rod 11, thus the front bottom rod 11 can be limited to continue to rotate downward, so as to limit the front bottom rod 11 to the expanded position. Furthermore, the rear bottom rod 21 is also kept in the expanded position, and the first reinforcing rod 41 and the second reinforcing rod 42 will also be far away from each other. When the connector 3 is fully moved to the first working position, the front frame 1 and the rear frame 2 will be fully unfolded. Besides, the first reinforcing rod 41 and the second reinforcing rod 42 are also unfolded in parallel, so that the first reinforcing rod 41 and the second reinforcing rod 42 can support the front bottom rod 11 and the rear bottom rod 21 through the first connecting rod 411 and the second connecting rod 421 respectively, so that the expansion between the first mainframe 13 and the second mainframe 23 can be strengthened.

In some embodiments, a linkage supporting frame 5 is provided on the front frame 1 and the rear frame 2 to ensure that the front frame 1 and the rear frame 2 are stable when they are unfolded. The linkage supporting frame 5 includes a first linking rod 51 hinged to the front bottom rod 11, an end of the first linking rod 51 is hinged with a first swing rod 52, an end of the first swing rod 52 is hinged with the second top rod 231; the rear bottom rod 21 is hinged with a second linking rod 53, an end of the second linking rod 53 is hinged with a second swing rod 54, an end of the second swing rod 54 is hinged with the first top rod 131, and the intersection of the first linking rod 51 and the second linking rod 53 is hinged together by rivets. A first supporting frame 12 is provided on the first mainframe 13, and an end of the first supporting frame 12 is hinged with an end of the first reinforcing rod 41. A second supporting frame 22 is provided on the second mainframe 23, and an end of the second supporting frame 22 is hinged with an end of the second reinforcing rod 42. The linkage supporting frame 5 can further reinforce when the front frame 1 and the rear frame 2 are unfolded, thus to ensure that the front frame 1 and the rear frame 2 can be reinforced when they are unfolded.

Specifically, the first linking rod 51 is hinged to on a middle of the front bottom rod 11, the end of the first swing rod 52 is hinged with a middle of the second top rod 231; the second linking rod 53 is hinged to on a middle of the rear bottom rod 21, the end of the second swing rod 54 is hinged with a middle of the first top rod 131.

Specifically, in the process of the front frame 1 and the rear frame 2 moving far away from each other, the first swing rod 52 and the second swing rod 54 start to rotate through the hinges between the first linking rod 51 and the second linking rod 53 respectively. After the front frame 1 and the rear frame 2 are fully unfolded, the first swing rod 52 and the second swing rod 54 will be aligned with the first linking rod 51 and the second linking rod 53 respectively, so as to reinforce the expansion of the first mainframe 13 and the second mainframe 23.

In some embodiments, both the first mainframe 13 and the second mainframe 23 are provided with detachable supporting rods 14, a ceiling 15 is provided on the supporting rods 14, both the first mainframe 13 and the second mainframe 23 are provided with detachable rolling wheels 16, and the second mainframe 23 is hinged with a pushing rod 24. The ceiling 15 can prevent the sun from directly shining on the front frame 1 and the rear frame 2, and the cooperation of the rolling wheel 16 and the pushing rod 24 can facilitate users to push the front frame 1 and the rear frame 2.

Specifically, the folding process and unfolding process of the folding cart are as follows: when the front frame 1 and the rear frame 2 need to be folded, the front frame 1 and the rear frame 2 are pushed in an opposite direction; when the front frame 1 and the rear frame 2 are moving, they will drive the first top rod 131 and the second top rod 231 to move close to one another respectively, so that the front bottom rod 11 and the rear bottom rod 21 also start to approach each other, and the first reinforcing rod 41 and the second reinforcing rod 42 also start to rotate through the hinge; the first reinforcing rod 41 and the second reinforcing rod 42 will also start to rotate through the hinge. After the front frame 1 and the rear frame 2 are moved, an acute angle can be formed between the first reinforcing rod 41 and the second reinforcing rod 42. At the same time, when the front frame 1 and the rear frame 2 are moving, they will also drive the first swing rod 52 and the second swing rod 54 to start rotating in such a manner as to make acute angles between the first swing rod 52 and the first connecting rod 51, and between the second swing rod 54 and the second connecting rod 53, so that the volume between the front frame 1 and the rear frame 2 begins to reduce, thus achieving the purpose of folding the front frame 1 and the rear frame 2.

When the front frame 1 and the rear frame 2 need to be unfolded, the front frame 1 and the rear frame 2 are pulled along a direction far away from each other, and the first top rod 131 and the second top rod 231 will start to move far away from each other, so that the first mainframe 13 and the second mainframe 23 start to move far away from each other, and the front bottom rod 11 and the rear bottom rod 21 will also start to move far away from each other, thus an end of the front bottom rod 11 is rotated again to enter into the inside of the locking member 211, so that the lapping portion 212 is lapped on the front bottom rod 11, thus the front bottom rod 11 can be limited to continue to rotate downward, so as to limit the front bottom rod 11 to the expanded position. Furthermore, the rear bottom rod 21 is also kept in the expanded position, and the first reinforcing rod 41 and the second reinforcing rod 42 will also be far away from each other. When the connector 3 is fully moved to the first working position, the front frame 1 and the rear frame 2 will be fully unfolded. Besides, the first reinforcing rod 41 and the second reinforcing rod 42 are also unfolded in parallel, so that the first reinforcing rod 41 and the second reinforcing rod 42 can support the front bottom rod 11 and the rear bottom rod 21 through the first connecting rod 411 and the second connecting rod 421 respectively, the first connecting rod 411 and the second connecting rod 421 can share the weight borne by the front bottom rod 11 and the rear bottom rod 21 to the first reinforcing rod 41 and the second reinforcing rod 42 respectively, thus reinforcing the expansion between the first mainframe 13 and the second mainframe 23. When the first reinforcing rod 41 and the second reinforcing rod 42 are unfolded, the first swing rod 52 and the second swing rod 54 also begin to rotate through the hinges between the first linking rod 51 and the second linking rod 53 respectively at the same time. After the front frame 1 and the rear frame 2 are fully unfolded, the first swing rod 52 and the second swing rod 54 will be collinearly aligned with the first linking rod 51 and the second linking rod 53 respectively, thus reinforcing the expansion between the first mainframe 13 and the second mainframe 23.

For technicians in this field, it is obvious that the present invention is not limited to the details of the above exemplary embodiments, and can be achieved in other specific forms without deviating from the spirits or basic characteristics of the present invention. Therefore, no matter from which point of view, the embodiments should be regarded as exemplary and non-restrictive. The scope of the present invention is limited by the attached claims rather than the above descriptions, so the purpose is to include all changes that fall within the meaning and scope of the equivalent elements of the claims in the present invention. Any accompanying marks in the claims should not be regarded as claims involved in the restrictions.

The invention claimed is:

1. A folding cart, having a folded state and an unfolded state, comprising a front frame, a rear frame and a foldable reinforcement assembly, wherein in the unfolded state the front frame and the rear frame move away from each other for unfolding, while in the folded state the front frame and the rear frame move towards each other for folding;
the front frame includes a front bottom rod configured to be turned upwards and downwards, and the rear frame includes a rear bottom rod configured to be rotatably unfolded or folded relative to the front bottom rod,
the foldable reinforcement assembly is used for connecting the front bottom rod and the rear bottom rod;
wherein the foldable reinforcement assembly includes a first reinforcing rod hinged to the front frame and a second reinforcing rod hinged to the rear frame, an end of the first reinforcing rod and an end of the second reinforcing rod form a hinge;
a first connecting rod is hinged on the first reinforcing rod, the first connecting rod is further hinged with the front bottom rod, and a second connecting rod is hinged on the second reinforcing rod, the second connecting rod is further hinged with the rear bottom rod;
wherein an end of the first connecting rod is hinged on a middle of the first reinforcing rod, the other end of the first connecting rod is further hinged on a middle of the front bottom rod, and an end of the second connecting rod is hinged on a middle of the second reinforcing rod, the other end of the second connecting rod is further hinged on a middle of the rear bottom rod.

2. The folding cart according to claim 1, wherein the other end of the first reinforcing rod and the other end of the second reinforcing rod are connected to the front frame and the rear frame, respectively.

3. A folding cart, having a folded state and an unfolded state, comprising a front frame, a rear frame and a foldable reinforcement assembly, wherein in the unfolded state the front frame and the rear frame move away from each other for unfolding, while in the folded state the front frame and the rear frame move towards each other for folding;
the front frame includes a front bottom rod configured to be turned upwards and downwards, and the rear frame includes a rear bottom rod configured to be rotatably unfolded or folded relative to the front bottom rod,
the foldable reinforcement assembly is used for connecting the front bottom rod and the rear bottom rod;
wherein the foldable reinforcement assembly includes a first reinforcing rod hinged to the front frame and a second reinforcing rod hinged to the rear frame, an end of the first reinforcing rod and an end of the second reinforcing rod form a hinge;
a first connecting rod is hinged on the first reinforcing rod, the first connecting rod is further hinged with the front bottom rod, and a second connecting rod is hinged on the second reinforcing rod, the second connecting rod is further hinged with the rear bottom rod;
wherein the front frame is provided with a first supporting frame, which includes a first direct-connecting part connected with the front frame and a first hinging part hinged with the first reinforcing rod, the first direct-connecting part is relatively bent with the first hinging part;
the rear frame is provided with a second supporting frame, which includes a second direct-connecting part connected with the rear frame and a second hinging part hinged with the second reinforcing rod, the second direct-connecting part is relatively bent with the second hinging part.

4. The folding cart according to claim 3, wherein the first direct-connecting part is longer than the first hinging part, the second direct-connecting part is longer than the second hinging part.

5. The folding cart according to claim 3, wherein an end of the rear bottom rod is connected with a locking member, and an end of the front bottom rod is located inside the locking member and forms a hinge, an end of the locking member protrudes from an end of the rear bottom rod, and the locking member is in groove shape.

6. The folding cart according to the claim 5, wherein an end of the locking member away from the rear bottom rod is provided with a lapping portion used for lapping on the front bottom rod in the unfolded state.

7. A folding cart, having a folded state and an unfolded state, comprising a front frame, a rear frame and a foldable reinforcement assembly, wherein in the unfolded state the front frame and the rear frame move away from each other for unfolding, while in the folded state the front frame and the rear frame move towards each other for folding;
the front frame includes a front bottom rod configured to be turned upwards and downwards, and the rear frame includes a rear bottom rod configured to be rotatably unfolded or folded relative to the front bottom rod,
the foldable reinforcement assembly is used for connecting the front bottom rod and the rear bottom rod;
wherein the front frame further includes a first mainframe and a first top rod hinged to an upper portion of the first mainframe, while the front bottom rod is hinged to a lower portion of the first mainframe;
the rear frame further includes a second mainframe and a second top rod hinged to an upper portion of the second mainframe, while the rear bottom rod is hinged to a lower portion of the second mainframe;
a connector is provided between the first top rod and the second top rod, an end of the first top rod and an end of the second top rod are both hinged with the connector;
wherein a linkage supporting frame is configured on the front frame and the rear frame for ensuring the stability of the front frame and the rear frame when the folding cart is unfolded;
wherein the linkage supporting frame includes a first linking rod hinged to the front bottom rod, an end of the first linking rod is hinged with a first swing rod, an end of the first swing rod is hinged with the second top rod;
a second linking rod is hinged with the rear bottom rod, an end of the second linking rod is hinged with a second swing rod, an end of the second swing rod is hinged with the first top rod, an intersection between the first linking rod and the second linking rod is hinged together by rivets.

8. The folding cart according to claim 7, wherein the first linking rod is hinged to on a middle of the front bottom rod, the end of the first swing rod is hinged with a middle of the second top rod, the second linking rod is hinged to on a middle of the rear bottom rod, the end of the second swing rod is hinged with a middle of the first top rod.

9. The folding cart according to claim 7, wherein both the first mainframe and the second mainframe are provided with detachable supporting rods, and a ceiling is provided on the supporting rods.

10. The folding cart according to claim 7, wherein both the first mainframe and the second mainframe are provided with detachable rolling wheels, and the second mainframe is hinged with a pushing rod.

* * * * *